Figure 1:
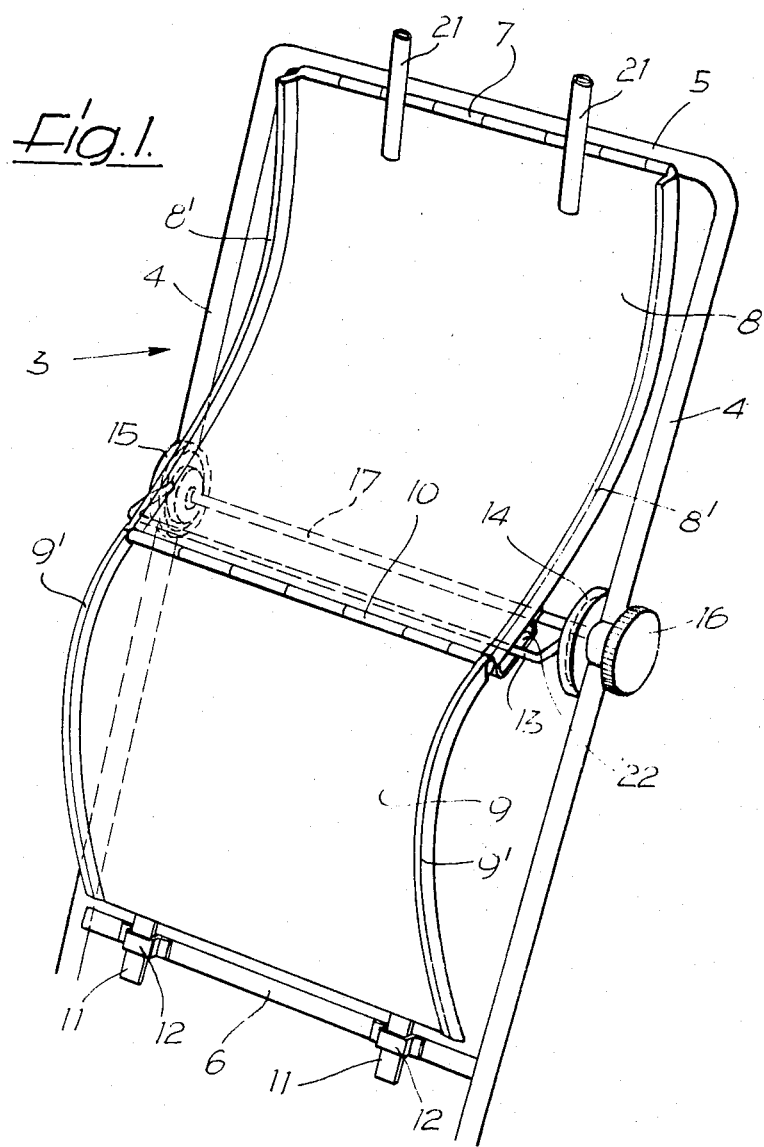

United States Patent [19]
Poschl

[11] 3,762,769
[45] Oct. 2, 1973

[54] SEAT, ESPECIALLY FOR MOTOR VEHICLES

[75] Inventor: Gunter H. Poschl, Schwaikheim, Germany

[73] Assignee: Recaro AG, Glarus/Schweiz, Switzerland

[22] Filed: Dec. 16, 1971

[21] Appl. No.: 208,860

[30] Foreign Application Priority Data
Dec. 30, 1970 Germany............... P 20 64 419.3

[52] U.S. Cl. .............................. 297/284, 297/460
[51] Int. Cl. .......................... A47c 7/14, B60n 1/06
[58] Field of Search.................. 297/284, 391, 458, 297/460

[56] References Cited
UNITED STATES PATENTS

| 1,205,802 | 11/1916 | Silbert | 297/284 UX |
| 3,106,423 | 10/1963 | Schwarz | 297/284 |

FOREIGN PATENTS OR APPLICATIONS

| 854,551 | 11/1960 | Great Britain | 297/284 |

*Primary Examiner*—Casmir A. Nunberg
*Attorney*—Arthur O. Klein

[57] ABSTRACT

A seat for a motor vehicle, the back rest of which is adjustable to different substantially sinusoidal curvatures by turning a single hand wheel. If the back rest carries a head support, an adjustment of the shape of the back rest also causes the position of the head support to be shifted forwardly or rearwardly.

6 Claims, 3 Drawing Figures

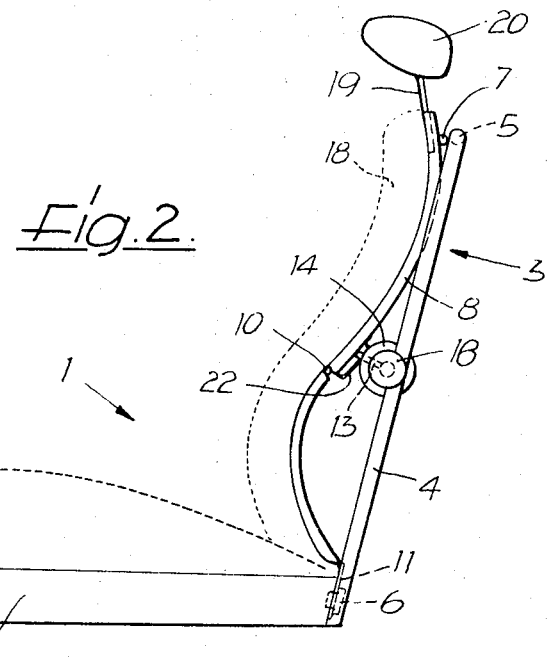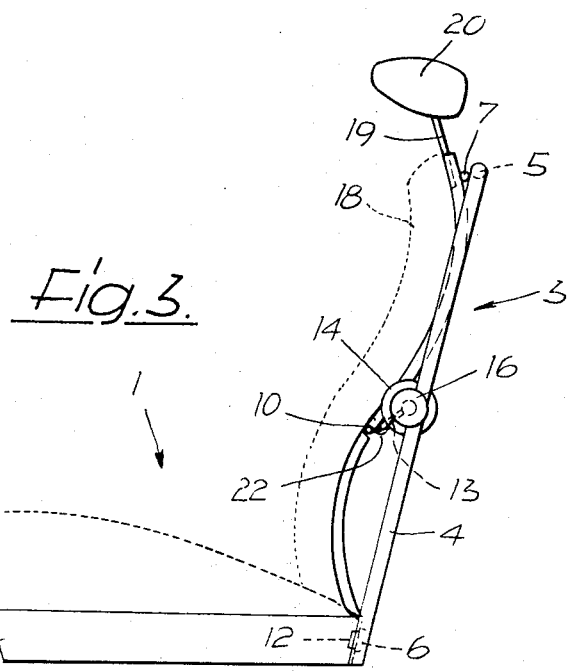

SEAT, ESPECIALLY FOR MOTOR VEHICLES

The present invention relates to a seat, especially for a motor vehicle, which has a back rest the longitudinal shape of which is adjustable and which is provided with a padding support which is divided in the transverse direction into two parts which are pivotable relative to each other.

There is a known seat of this type in which the lower half of the padding support is pivotable about a horizontal axis which is located at the level of its upper edge, while the upper half of the padding support is rigidly connected to the frame of the back rest. This seat therefore only permits the depth of the seat to be varied by pivoting the lower half of the padding support. This has principally the disadvantage that the more the lower half of the padding support is pivoted forwardly, the more orthopedically unsuitable the seat and back rest will become to its occupant.

It is an object of the present invention to provide a seat the back rest of which is adjustable by very simple means to vary its longitudinal shape which determines the supporting surface for the back of a seat occupant, and which still permits especially the hip area of the occupant to be properly supported orthopedically. Proceeding from a seat of the type as described in the first paragraph above, this object is attained according to the invention by movably connecting the upper part of the padding support of the back rest adjacent to its upper edge and the lower part of this support adjacent to its lower edge to the frame of the back rest and by supporting both parts at least indirectly on an adjusting device which permits them to be pivoted to and maintained in different positions relative to each other.

Such a padding support of a back rest which is adjustable to the greatest extent adjacent to the joint between its upper and lower parts and in the longitudinal direction of the seat permits the longitudinal shape of the back rest to be varied considerably in accordance with the requirements of the seat occupant, also insofar as the depth of the seat is concerned, and at the same time it produces a good support of the hip area of the occupant. This is true particularly if in accordance with a preferred embodiment of the invention each of the two parts of the padding support of the back rest forms a stiff plate and the two plates are pivotably connected to each other at their edges facing each other. The two plates will then together form a supporting surface for the back of the seat occupant which is molded and curved in accordance with the orthopedic requirements of this particular occupant. Normally it will then be sufficient to provide the upper plate longitudinally with a concave curvature as seen from the back of the seat occupant and the lower plate with a convex curvature. The padding support of the back rest will then be curved longitudinally substantially in accordance with the course of a normal human spinal column, as seen in a side view. This basic longitudinal shape of the back rest will remain, even though its particular curvature may be varied by pivoting the two plates relative to each other by means of the adjusting device. Although an adequate support of the spinal column could also be attained if the frame of the back would be divided in its transverse direction and the two frame parts would be connected to each other so as to permit them to be locked in different pivoted positions relative to each other, such a divided frame of the back rest would, however, be unsuitable for safety reasons, especially if a safety belt is to be secured to this frame.

The adjusting device for the padding support of the back rest according to the invention is preferably provided with a locking device and designed so as to permit an adjustment to be carried out as easily as possible. This requirement may be fulfilled, for example, by providing the adjusting device with a planetary gear, which is especially of advantage since it permits the connecting points of the two parts of the padding support to be shifted in a very simple manner as by an eccentric in the longitudinal direction of the seat relative to each other.

If in accordance with a preferred embodiment of the invention one or a pair of supporting elements for a head support are secured to the upper part of the padding support of the back rest, the further advantage is attained that, when the shape of the padding support is changed, the head support will also be pivoted to a different position about a horizontal axis. The head support may in this manner be adjust considerably in the longitudinal direction of the seat. This is of great advantage insofar as a head support can effectively protect the head of a seat occupant only if it is in engagement with or closely adjacent to the head. If sufficiently secure the head supports as are presently known, may, if at all, be adjusted only insufficiently in the longitudinal direction of the seat so as to be moved into engagement with the head of the seat occupant or to a position closely adjacent thereto.

The features and advantages of the present invention will become further apparent from the following detailed description thereof which is to be read with reference to the accompanying drawings, in which FIG. 1 shows a diagrammatic perspective view of the back rest according to the invention from which the padding is removed; while FIGS. 2 and 3 show two diagrammatic side views of the back rest according to FIG. 1 in different positions of adjustment and with a head rest thereon.

In the drawings, a vehicle seat 1 comprises a seat part 2 of a conventional construction and a back rest 3 which is pivotably connected to the seat part 2 by means not shown and adapted to be locked in different angular positions relative to the seat part. The back rest 3 comprises a frame consisting of a pair of lateral frame members 4 extending in the longitudinal direction of the back rest and of a pair of transverse frame members 5 and 6 which connect the lateral frame members 4 to each other at their upper end and near their lower end, respectively.

By means of a hinge 7 the upper edge of a padding support is pivotably connected to the upper transverse frame member 7. This padding support consists of two substantially rigid plates 8 and 9 which have reinforced lateral edges 8' and 9' and a slightly smaller width than that of the space between the lateral frame members 4 so that they may be passed through this space without engaging with the frame members 4. The upper plate 8 which is connected by the hinge 7 directly to the upper frame member 5 has a concave curvature in the longitudinal direction of the back rest or its lateral frame members 4, as seen from its front side facing a seat occupant, while the lower plate 9 has a convex curvature. The curvature of both plates together, as seen in a side view, corresponds substantially to the normal sinusoidal curvature of the spinal column of a seat occupant. The lower edge of the upper plate 8 and the upper edge of the lower plate 9 are connected to each other by a hinge 10 the axis of which extends parallel to the axis of hinge 7 and therefore also parallel to the upper transverse frame member 5 and approximately coincides with the reversing point of the sinusoidal curve which is formed by both plates 8 and 9 when seen from the side, and which point is located near the center of the height of the back rest depending upon the total length of its frame.

The lower end of the lower plate 9 is provided with two connecting bars 11 which are either resilient or, if rigid, are resiliently or flexibly connected to plate 9 and extend transversely to the longitudinal direction of the lower transverse frame member 6 and are slidable in the longitudinal direction of the lateral frame members 4 in guide brackets 12 which are secured to frame member 6. The lower edge of the lower plate 9 will therefore remain connected to and be guided by the lower frame member 6 by means of this slidable connection of bars 11 and brackets 12 when the two plates 8 and 9 are pivoted relative to each other and thereby cause the distance between the lower edge of the lower plate 9 and the upper edge of the upper plate to be changed.

Adjacent to the hinge 10 which connects the two plates 8 and 9 to each other, one of these plates, for example, plate 8, rests across its entire width on a rod 13 and remains in engagement therewith by guide brackets 22 which are secured to this plate. The opposite ends of rod 13 projecting laterally over the edges 8' and 9' of the plates are secured to the sun wheels of a pair of equal self-locking planetary gears 14 and 15 which are mounted in gear housings on the lateral frame members 4. As indicated at the left side of FIG. 1, the planet wheels of these gears are secured to a common shaft 17 which is adapted to be turned by a hand wheel 16. When hand wheel 16 is turned on the outer side of one lateral frame member 4, rod 13 will carry out a circular movement about the axis of shaft 17 and will thereby pivot the upper plate 8 about the axis of hinge 7 and also pivot the two plates 8 and 9 relative to each other about the axis of hinge 10 and also the lower plate 9 about an axis which extends through the connecting bars 11 if they are resilient, or if they are rigid through their flexible or hinged connections to the lower end of the lower plate 9. When such a pivoting movement is being carried out, the lower edge of plate 9 will also shift upwardly or downwardly, while the connecting bars 11 will slide within the brackets 12 on the lower frame member 6.

FIGS. 2 and 3 show the plates 8 and 9 in two differnt positions to which they have been adjusted by the hand wheel 16 and the two planetary gears 14 and 15. Since these planetary gears are self-locking, plates 8 and 9 will remain in the particular position to which they have been adjusted. In the position as illustrated in FIG. 2, the lower plate 9 is pivoted for a considerable distance forwardly of the plane which is formed by the frame of the back rest. This causes the two plates together to have a considerable sinusoidal curvature, while the depth of the seat is reduced. FIG. 3 illustrates a position in which the sinusoidal curvature of the back rest 3 is reduced and the depth of the seat is increased. Since the two plates 8 and 9 are rigid and consist, for example, of sheet metal or a hard plastic, a padding 18 is applied thereon which also smoothes out any angularity between the adjacent edges of plates 8 and 9 which are connected by the hinge 10.

As shown particularly in FIG. 1, a pair of tubular members 21 is welded upon the upper plate 8. These tubular members 21 are adapted to receive two rods 19 which may be adjusted in these members 21, for example, by setscrews, to different heights above the upper frame member 5 and have a head support 20 pivotably connected to their upper ends. As illustrated in FIGS. 2 and 3, a pivoting movement of plates 8 and 9 also results in a considerable displacement of the head support 20 in the longitudinal direction of the seat. Of course, the head support 20 may also be replaced by a head support of a different shape and construction as long as it is secured directly or indirectly to the upper plate 8.

Although my invention has been illustrated and described with reference to the preferred embodiment thereof, I wish to have it understood that it is in no way limited to the details of such embodiment but is capable of numerous modifications within the scope of the appended claimms.

Having thus fully disclosed my invention, what I claim is:

1. A seat having a seat part and a back rest, said back rest comprising a substantially rigid frame having substantially horizontal upper and lower frame members and lateral frame members connecting said upper and lower frame members to each other, a padding support divided into an upper part and a lower part, upper pivot means for pivotably connecting said upper part near its upper end to said upper frame member, and lower pivot means for pivotably connecting said lower part near its lower end to said lower frame member, said upper and lower pivot means having substantially horizontal axes, adjusting means for pivoting said two parts to different positions relative to each other about said upper and lower axes and for maintaining said two parts in each of said positions, and padding means connected to one side of said two parts, said two parts of said padding support consist of two substantially rigid plates, and flexible means connecting said plates to each other at their edges facing each other, said two plates are curved in opposite directions to each other and said flexible means pivotably connect said edges of said plates to each other, said adjusting means being adapted to act upon one of said plates adjacent to said edges to pivot both of said plates simultaneously in opposite directions about said axes, said pivot means on one of said parts also being slidably connected to one of said horizontal frame members so as to be slidable substantially in the direction of said lateral frame members when said plates are being adjusted by said adjusting means from one position to a different position relative to each other.

2. A seat as defined in claim 1, in which, when said back rest is seen from the front, said upper plate has a convex curvature and said lower plate has a convex curvature, said flexible means connecting said edges of said two plates forming at least one hinge having a substantially horizontal axis, said plates when seen in a side view together having a continuous substantially sinusoidal curvature.

3. A seat as defined in claim 1, in which said upper pivot means comprise at least one hinge, and said lower pivot means comprise means for connecting the lower end of said lower plate to said lower frame member so as to be pivotable about a horizontal axis as well as slidable substantially in the direction of said lateral frame members.

4. A seat as defined in claim 1, in which said adjusting means comprise gear means, a manipulating member mounted on one of said lateral frame members and rotatable about its axis for turning said gear means and an eccentric member connected to said gear means and extending eccentrically to said last mentioned axis and adapted to act upon the rear side of one of said plates near said flexible connecting means.

5. A seat as defined in claim 4, in which said gear means are adapted to be turned by said manipulating member so as to turn said eccentric member, said gear means incapable of being turned by said eccentric member when a pressure is exerted by one of said plates upon said eccentric member.

6. A seat as defined in claim 1, further comprising means for securing a head support to said upper part of said padding support so that, when said upper part is pivoted to a different position by said adjusting means, said head support will also be pivoted to a different position relative to the head of an occupant of said seat.

* * * * *